United States Patent
Corbett et al.

(10) Patent No.: US 12,063,506 B2
(45) Date of Patent: Aug. 13, 2024

(54) METHOD AND UNIT UNAUTHORISED DATA TRAFFIC IN A PACKET-ORIENTED DATA NETWORK OF A MOTOR VEHICLE, AND CORRESPONDING MOTOR VEHICLE

(71) Applicant: AUDI AG, Ingolstadt (DE)

(72) Inventors: Christopher Corbett, Lenting (DE); Felix Baumann, Dollnstein (DE)

(73) Assignee: AUDI AG, Ingolstadt (DE)

(*) Notice: Subject to any disclaimer, the term of this patent is extended or adjusted under 35 U.S.C. 154(b) by 235 days.

(21) Appl. No.: 17/774,121

(22) PCT Filed: Oct. 27, 2020

(86) PCT No.: PCT/EP2020/080093
§ 371 (c)(1),
(2) Date: May 3, 2022

(87) PCT Pub. No.: WO2021/089359
PCT Pub. Date: May 14, 2021

(65) Prior Publication Data
US 2022/0394470 A1 Dec. 8, 2022

(30) Foreign Application Priority Data
Nov. 4, 2019 (DE) .................... 10 2019 129 628.5

(51) Int. Cl.
*H04W 12/08* (2021.01)
*H04L 9/40* (2022.01)
*H04W 4/40* (2018.01)

(52) U.S. Cl.
CPC ............. *H04W 12/08* (2013.01); *H04W 4/40* (2018.02)

(58) Field of Classification Search
CPC ........ H04W 12/08; H04W 4/40; H04L 67/12; H04L 63/1441; H04L 63/1425
See application file for complete search history.

(56) References Cited

U.S. PATENT DOCUMENTS

| 8,850,583 B1 | 9/2014 | Nelson et al. |
| 10,498,749 B2 | 12/2019 | Kupfer et al. |

(Continued)

FOREIGN PATENT DOCUMENTS

| DE | 102018122152 A1 | 3/2019 |
| DE | 102017221889 A1 | 6/2019 |

(Continued)

OTHER PUBLICATIONS

International Preliminary Report on Patentability directed to related International Patent Application No. PCT/EP2020/080093, completed Apr. 28, 2021, with attached English-language translation; 13 pages.

(Continued)

*Primary Examiner* — Amie C. Lin
(74) *Attorney, Agent, or Firm* — Sterne, Kessler, Goldstein & Fox P.L.L.C.

(57) ABSTRACT

The present disclosure relates to a method for detecting unauthorized data traffic in a packet-oriented data network of a motor vehicle, wherein at least one data packet is read out of the data network by a processor circuit, and header data of each data packet is checked for link information indicating that the data packet belongs to a communication link that is permitted for the operation of the motor vehicle. If the data packet is recognized as belonging to a permitted communication link, payload data of the data packet is checked to determine whether data values of the payload data have a value profile that is provided for the communication link. If a permitted communication link or a permitted value profile for the data packet is missing, a detection signal is generated to identify the data packet as unauthorized data traffic.

7 Claims, 2 Drawing Sheets

(56) References Cited

U.S. PATENT DOCUMENTS

| | | | |
|---|---|---|---|
| 2008/0201772 A1 | 8/2008 | Mondaeev et al. | |
| 2013/0275761 A1* | 10/2013 | Catsburg | H04L 9/3247 |
| | | | 713/176 |
| 2015/0089236 A1* | 3/2015 | Han | H04L 9/3271 |
| | | | 713/168 |
| 2018/0004964 A1* | 1/2018 | Litichever | H04L 12/40169 |
| 2018/0083914 A1 | 3/2018 | Yamaura | |
| 2018/0300477 A1* | 10/2018 | Galula | H04L 63/1416 |
| 2019/0104108 A1 | 4/2019 | Rhee et al. | |
| 2020/0334355 A1 | 10/2020 | Klein et al. | |

FOREIGN PATENT DOCUMENTS

| | | |
|---|---|---|
| EP | 3111614 A1 | 1/2017 |
| EP | 3373553 A1 | 9/2018 |
| WO | WO 2015/128613 A1 | 9/2015 |
| WO | WO 2016/055730 A1 | 4/2016 |

OTHER PUBLICATIONS

International Search Report and Written Opinion of the International Searching Authority directed to related International Patent Application No. PCT/EP2020/080093, mailed Jan. 29, 2021 with attached English-language translation; 17 pages.

Dorfinger, Peter et al., "Entropy Estimation for Real-Time Encrypted Traffic Identification (Short Pater)," Lecture Notes in Computer Science, Jan. 1, 2011, Springer Berlin Heidelberg, Berlin, Heidelberg; pp. 164-171.

* cited by examiner

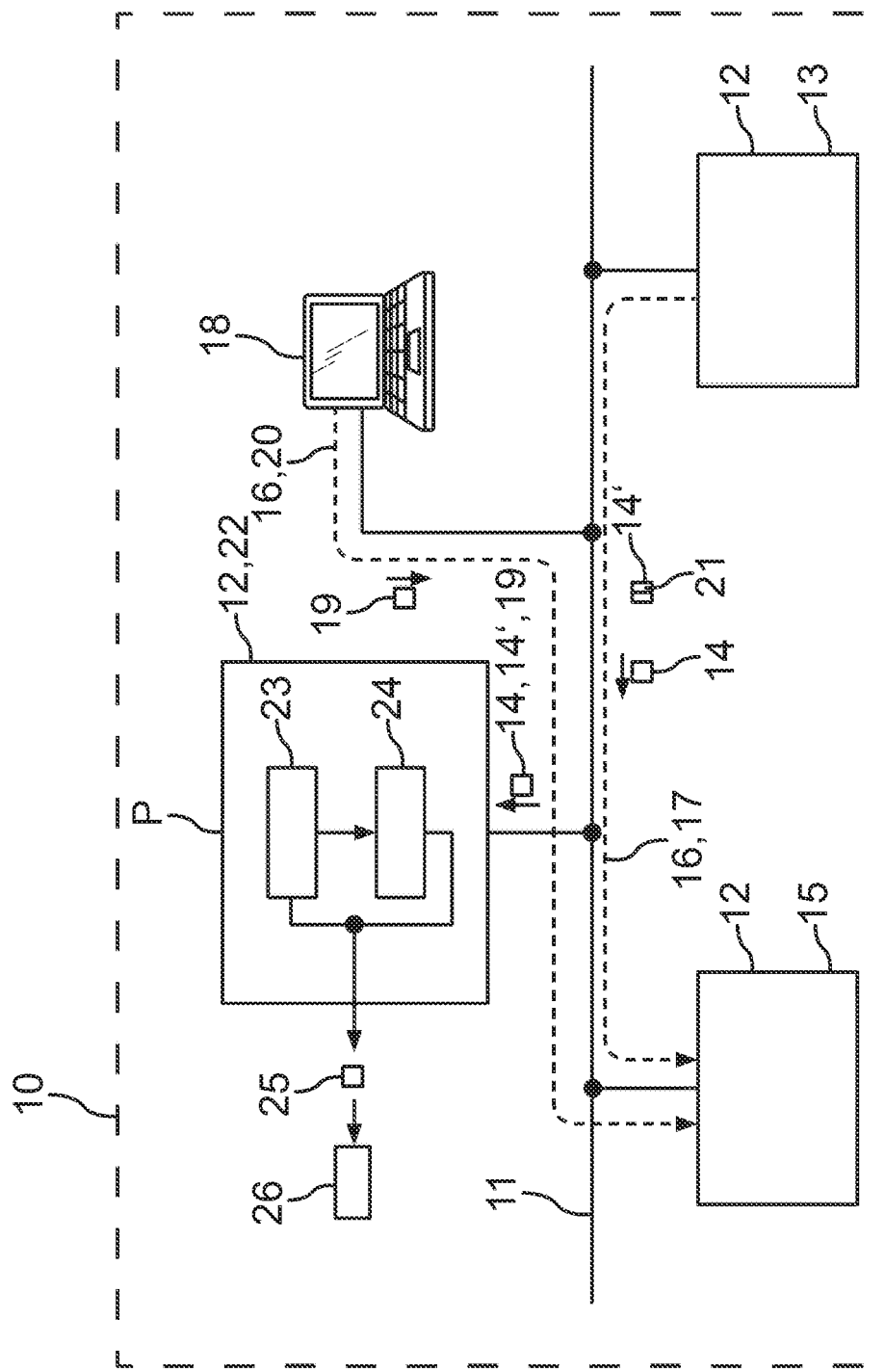

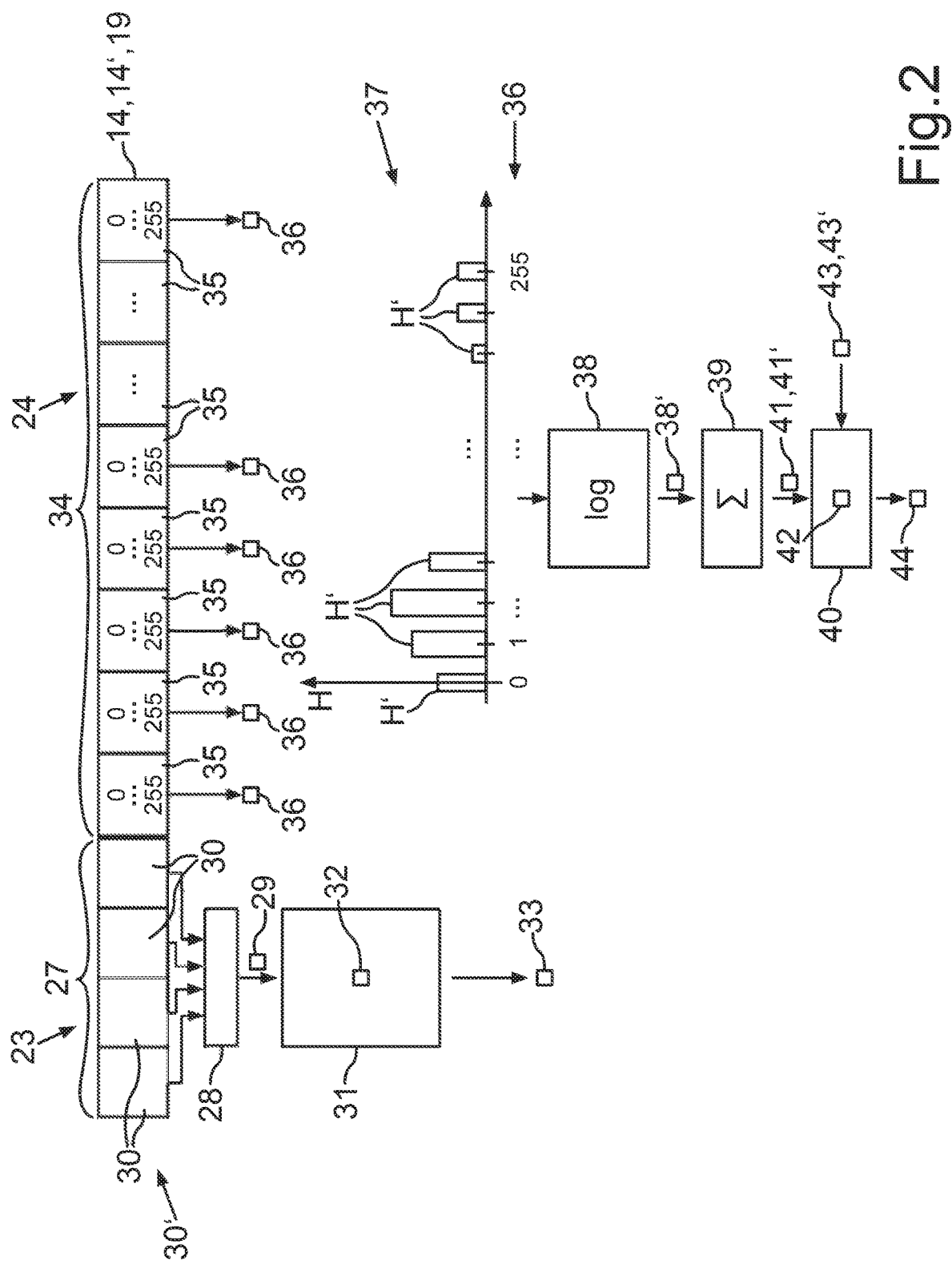

METHOD AND UNIT UNAUTHORISED DATA TRAFFIC IN A PACKET-ORIENTED DATA NETWORK OF A MOTOR VEHICLE, AND CORRESPONDING MOTOR VEHICLE

TECHNICAL FIELD

The present disclosure relates to a method for detecting unauthorized data traffic in a packet-oriented data network of a motor vehicle. Such unauthorized data traffic can occur if a control unit of the motor vehicle is manipulated by a hacker attack and/or an additional computer not provided by the manufacturer of the motor vehicle is connected to the data network. The present disclosure also includes a control unit, by means of which the method can be carried out in a motor vehicle, and a motor vehicle having such a control unit.

BRIEF SUMMARY

In addition or as an alternative to a data bus, a packet-oriented data network, for example, an Ethernet network, can also be provided in a motor vehicle. In contrast to a data bus, a packet-oriented data network can also be used to set up communication links which, according to the vehicle specification, are not provided by the manufacturer of the motor vehicle. However, this can make it possible for a user with manipulation intentions, proceeding from an already manipulated control unit of the motor vehicle or by connecting an additional computer to the data network, to plant in the motor vehicle harmful data that disrupt the error-free operation of the motor vehicle via a newly created communication link to a further control unit. However, even if only a communication link between two control units, which is already provided according to the vehicle specification, can be used in such a hacker attack, it is, unlike with a data bus, still possible in a packet-oriented data network to exploit more degrees of freedom in designing the so-called payload (user data portion) in a data packet to transmit malicious data to a control unit of the motor vehicle.

In a packet-oriented data network of a motor vehicle with packet-oriented data traffic, in particular an Ethernet network, detection of manipulative attacks or hacker attacks is therefore desirable.

Monitoring data traffic in a data network of a motor vehicle is known, for example, from DE 10 2018 122 152 A1, EP 3373553 A1, US 2018/0083914 A1, and WO 2016/055730 A1. However, the known solutions do not offer the double protection of detecting in a data network both new communication links not provided according to the vehicle specification and manipulations carried out via communication links permissible according to the vehicle specification. However, the detection of such unauthorized data traffic (not provided in the vehicle specification) is desirable in order to ensure undisturbed operation of the motor vehicle.

BRIEF DESCRIPTION OF THE DRAWINGS/FIGURES

FIG. 1 shows a schematic depiction of one embodiment of the vehicle according to the present disclosure.

FIG. 2 shows a sketch for illustrating two test routines that can be applied to a data packet of the data network.

DETAILED DESCRIPTION

The problem addressed by the present disclosure is that of detecting unauthorized data traffic (so-called intrusion detection) in a packet-oriented data network in a motor vehicle.

The problem is solved by the subject matter of the independent claims. Advantageous embodiments can be found in the dependent claims, the following description and the figures.

The present disclosure provides a method for detecting unauthorized data traffic in a packet-oriented data network of a motor vehicle. The method can be carried out by a processor circuit which, for example, can be provided in a control unit of the motor vehicle. The method assumes that the processor circuit is coupled to the data network in order to be able to receive or at least read at least one data packet from the data network itself. In the method, at least one data packet transmitted in the data network is thus read out of the data network. In this way, the data packet can be addressed to the processor circuit or another receiving device. It is now necessary to determine whether such a data packet represents unauthorized data traffic, i.e., data traffic which, according to a known vehicle specification provided, for example, by the manufacturer of the motor vehicle, is not permissible or should not be present.

The following steps are carried out for each data packet read out. The processor circuit uses a first test routine to check header data, i.e., data of a so-called packet header, to determine whether the link information described by the header data indicates a communication link which is permitted for the operation of the motor vehicle. This is possible because the communication link is generally uniquely identified in the header data, for example, by a combination of sender address and recipient address and/or a send port and/or a receive port and/or a send application and/or a receive application. The permissible communication link can be found in said vehicle specification because during the construction of the motor vehicle, it is already known before the actual operation of the motor vehicle and determined by means of programming data which control unit will generally operate a communication link with which other control unit. A plurality of permissible communication links can be defined or described in the motor vehicle, for example, by specification data. Based on the header data, the processor circuit can now recognize whether the currently read data packet belongs to a communication link which is permitted for the operation of the motor vehicle.

If the data packet is recognized as belonging to such a permitted communication link, the payload data of the data packet, i.e., the user data that differ from the header data and are usually sent after the header data, are checked in a second step using a second test routine as to whether data values of the payload data have a value profile that is typical or provided for the communication link. For example, the payload data can be seen as a series of individual bytes, wherein each byte can then represent a numerical value from 0 to 255 (8 bits). If the communication link is used in the manner intended for the operation of the motor vehicle, i.e., according to the specification, the individual bytes of the payload data will predictably each have a value in an expectable or typical value interval. The combination of the values of all payload data results in the value profile, i.e., a value specification per byte, for example. If this value profile corresponds overall to the target profile or to one of a plurality of possible target profiles provided for the communication link, the data packet can be regarded as authorized or as typical or intended for the operation of the motor vehicle. A person skilled in the art can determine which part of a data packet belongs to the header data and which part belongs to the payload data and which of these parts is thus fed to the first or the second test routine. The header data and the payload data can be disjunct or completely or partially overlap. The division into header data and payload data can be a result of the communication protocol used. The payload data can be the data provided for the receiving application (application program in the receiving device); the header data can be the data provided for the protocol stack of the receiving device (intermediate layers of the ISO/OSI reference model).

However, if one of the cases occurs in which a permitted communication link or a permitted value profile for the data packet is missing, a detection signal is generated by the processor circuit, which characterizes or signals the data packet as unauthorized data traffic. Such a detection signal can then be used, for example, to trigger a protective measure, for example, an operational interruption of the motor vehicle. The protective measure can be selected, for example, on the basis of the control units affected by the data packet.

The method described can be used not only in a single central component (e.g., a switch or a router or a gateway) in the data network of a motor vehicle, but, additionally or alternatively, it can also be implemented and used in one or more terminals/control units. This allows coverage to be scaled and/or localized as needed. Therefore, the method can generally be carried out individually by a single processor circuit or by a plurality of processor circuits.

The present disclosure offers the advantage that, in the packet-oriented data network, malicious data that could disrupt the operation of the motor vehicle cannot be planted in the motor vehicle either via a newly created or applied communication link or via an already existing, authorized communication link.

The present disclosure also comprises embodiments which result in additional advantages.

In one embodiment, the value profile comprises, as mentioned above, that the payload data are divided into data segments, for example, individual bytes, and a numerical value defined by the bits of this data segment is determined for each data segment and a respective absolute or relative frequency of the numerical values occurring in the data segments is counted. In this embodiment, the numerical value represented by the bits of said data segment is determined independently of a position of the respective data segment in the payload data, and the absolute or relative frequency of the numerical values occurring in the payload data of the current data packet is determined in a histogram. This has the advantage that only one counter per possible numerical value has to be managed or implemented to check a data packet, which allows the data packet to be analyzed in a short time, so that successive data packets in the data network can be checked without interruption.

In one embodiment, said value profile comprises that an entropy value is calculated for the data packet based on the frequencies of the numerical values and a respective specific target entropy value is kept ready in a data storage device for each permitted communication link, and only if the calculated entropy value deviates by less than a predetermined tolerance value from the target entropy value of the communication link to which the data packet belongs, is the value profile recognized as permissible. For the payload data of the data packet, only a single value to be checked is advantageously calculated using the entropy value. As a result, the check can be carried out with only a few calculation steps. Since the payload data are checked in the event that the underlying communication link was recognized as belonging to the operation of the motor vehicle, it is also known which target entropy value is to be expected for this communication link. The entropy value of the payload data of the current data packet must then lie within a predetermined tolerance interval (defined by the tolerance value), so that the current data packet is also recognized as valid in terms of the identified communication link. By using the tolerance value, different operating situations of the motor vehicle can be taken into account.

In one embodiment, the entropy value is calculated by calculating a sum of the logarithmized frequency values or of the logarithmized inverted frequency values. Therefore, the entropy value comprises the information from every possible numerical value that can occur in the data segments of the payload data. A deviation from the expected value profile is thus not linearly evaluated by logarithmization, which increases the sensitivity of the detection method in comparison to a linear summation or weighted summation.

In one embodiment, the first test routine (by means of which it is checked as to whether the data packet even belongs to a permissible communication link) comprises that the predetermined data element or at least one predetermined data element of the header data is selected and a hash value or checksum value is calculated for each selected data element. In other words, all selected data elements are combined and the hash value or checksum value is calculated for the combined data elements. Regardless of how many data elements are selected from the header data, they are combined into a hash value or a checksum value. In this way the selection of the data elements, for example, can be adapted or reconfigured without having to adapt the rest of the test routine because a hash value or a checksum value with consistent length must continue to be processed. It is checked as to whether the calculated hash value matches a target hash value, wherein at least one target hash value is kept ready in a data storage device for each permitted communication link. One or more than one target hash value can therefore be provided per communication link in order to describe the communication link or each of a plurality of embodiments of the communication link by one target hash value. Therefore, even if a plurality of different data elements from the header data is used, only a single comparison between the hash value/checksum value and each possible target hash value is required. Each hash value/checksum value represents a specific combination of data elements, so that the checking of a single hash value/checksum value checks the entire combination. This is advantageously efficient.

In one embodiment, the first test routine comprises checking by means of a cuckoo filter and/or by means of a Bloom filter. In particular, the described hash value or checksum value is checked by means of one or both of said filters. This results in the advantage that no numerical comparison with one or more target hash values is necessary; instead, agreement is achieved if the filtering by means of the cuckoo filter and/or the Bloom filter produces a corresponding filter result.

In one embodiment, one such data element or a plurality of such data elements is selected from the header data, which describe one or more or all of the following properties of the communication link: A sender address, a recipient address, a MAC address, a payload length (data length of the payload user data of the data packet following the header data). These data elements have been found to be meaningful or useful as a description of a communication link. In particular, a combination of a plurality of these data elements is suitable for clearly distinguishing the communication link from any other communication link.

As already stated, the method in connection with a packet-oriented data network is particularly suitable for an Ethernet network. Such an Ethernet network is "stateless," therefore, the independent checking of individual data packets, as is provided with the method, can be provided here.

In order to carry out the method according to the present disclosure in a motor vehicle, the present disclosure also provides a control unit for a motor vehicle. This control unit can be connected to a data network of the motor vehicle and can be designed, for example, as a transmitting device or receiving device or as a router or as a switch. The control unit has a processor circuit which is designed to carry out an embodiment of the method according to the present disclosure. For this purpose, the processor circuit can have at least one microprocessor and/or at least one microcontroller. The processor circuit can have a data storage device that stores program instructions which, when executed by the processor circuit, are set up to trigger the processor circuit to carry out said embodiment of the method according to the present disclosure. The data storage device can be designed as a non-volatile computer-readable storage medium, for example, as a flash memory or ROM (read only memory) or as an SSD.

A motor vehicle is also part of the present disclosure. This motor vehicle has a data network, in particular an Ethernet network, and at least one control unit according to the present disclosure, which is connected to the data network. The motor vehicle according to the present disclosure is preferably designed as a car, in particular as a passenger car or a truck.

The present disclosure also comprises the combinations of the features of the described embodiments.

In the following, embodiments of the present disclosure are described.

The embodiments described below are preferred embodiments of the present disclosure. In the embodiments, the described components of the embodiments each represent individual features of the present disclosure which should be considered in isolation and which each develop the present disclosure independently of one another. The disclosure is therefore also intended to include combinations of the features of the embodiments other than those presented. Furthermore, the described embodiments may also be supplemented by further, previously described features of the present disclosure.

In the figures, the same reference signs denote functionally identical elements.

FIG. 1 shows a motor vehicle 10 which can be a car, in particular a passenger car or a truck. In the motor vehicle 10, a data network 11 can be provided which can make packet-oriented data traffic possible. The data network 11 can in particular be an Ethernet network. Control units 12 of the motor vehicle can be connected to the data network 11. In the following, it is assumed that, within the scope of the embodiment, one of the control units 12 represents a transmitting device 13 which transmits data packets 14 to a receiving device 15. Since the transmission of the data packets 14 from the transmitting device 13 to the receiving device 15 is provided in accordance with the vehicle specification of the motor vehicle 10, i.e., according to orderly operation, the resulting communication link 16 is a permissible communication link 17. A communication link 16 results, for example, from the combination of transmitting device 13, receiving device 15, and communication content or communication type of the data packets 14, i.e., for example, the message type in data packets 14 (e.g., transmission of a temperature value or speed value or a specific control command, to name a few examples). FIG. 1 shows that an additional transmitting device 18 can also be connected to the data network 11, for example, a computer belonging to a person attempting to manipulate the operation of the motor vehicle 10. The additional transmitting device 18 can also be a manipulated control unit of the motor vehicle 10. In the example shown, the additional transmitting device 18 also sends data packets 19 to the receiving device 15, wherein, however, the combination of the transmitting device 18 toward the receiving device 15 results in a communication link 16 which represents an unintended or non-permissible combination link 20 because it is not is part of the vehicle specification. In connection with the transmitting device 13, it can occur that, for example, due to a manipulation of its operating software, said transmitting device also sends one or more data packets 14' to the receiving device 15 via the permissible communication link 17, but the data packets 14' contain a non-permissible data content 21, for example, non-permissible data values for speed or power or also control commands for the receiving device 15.

In order to detect the non-permissible communication link 20 and/or the manipulated data packets 14' in the data network 11, at least one control unit 12, herein the control unit 22 in FIG. 1, in the motor vehicle 10 can be configured to detect this unauthorized or non-specification data traffic of the data packets 19, 14'. For this purpose, the control unit 22 can eavesdrop on or read out the data traffic in the data network 11, i.e., generate a copy of the transmitted data packets 14, 14', 19 and use a first test routine 23 and a second test routine 24 to check as to whether the data packets are from a non-permissible communication link 20 and/or whether they are manipulated data packets 14' from a permissible communication link 17.

If the test routines 23, 24 detect that at least one manipulated data packet 14' and/or a non-permissible communication link 20 is present in the data network 14, the control unit 22 can generate a detection signal 25, on the basis of which at least one protective measure 26 can be triggered in the motor vehicle 10 to respond to the unauthorized data traffic. For example, the motor vehicle 10 can be stopped or the operation of the motor vehicle 10 can be interrupted.

FIG. 2 illustrates possible implementations of the test routines 23, 24.

It shows how an individual data packet read out of the data network 11 can be processed. It is initially unknown whether it is a permissible data packet 14, a manipulated data packet 14' or a data packet 19 of a non-permissible communication link 20.

A checksum or a hash value 29 can be calculated by means of the test routine 23 on the basis of header data 27 of the data packet using a checksum function 28. For this purpose, possible data elements 30 of the header data 27 can be selected from the header data 27. Possible data elements can be the described sender address, recipient address, MAC address, payload length, to name only a few examples. The calculated hash value 29 or checksum value can be checked, for example, by means of a cuckoo filter 31 to determine as to whether the hash value 29 or the checksum value in general is a valid hash value or target hash value 32, as should be the case if the header data 27 describe a permissible communication link 17. A filter result 33 describes whether the hash value 29 matches a possible target hash value 32. If this is not the case, the detection signal 25 can be generated (see FIG. 1). Otherwise, the test routine 24 can be carried out. The test routine 24 can be applied to the payload data 34 of the data packet. In this case, the payload data 34 can be subdivided into data segments 35; for example, the individual bytes of the payload data can be checked. This case is assumed in FIG. 2, so that the bits of each data segment 25 (individual byte) can represent a range from 0 to 255.

The test routine 24 can provide that the frequency H of the resulting actual numerical values 36 is counted with the payload data 34. For every possible numerical value 36 there is thus a frequency value H'. This results in a histogram 37 of the frequencies H of the possible numerical values 36. Therefore, the frequency of each numerical value 0, 1, 2, . . . 255 is counted.

On the basis of the frequencies H, the logarithmized value 38' of the respective frequency value H' or of the inverted frequency value H' can be calculated using a logarithmic function 38, wherein the frequency value 0 can be treated in a special way. The values can be combined by means of a sum function 39, i.e., the sum of the logarithmized frequency values or the logarithmized inverted frequency values can be calculated. A comparison function 40 can be used to check as to whether the resulting sum 41 deviates by less than a predetermined tolerance value 42 from a target entropy value 43 which can be provided for the additional communication link 17 recognized by means of the header data 27. The sum 41 represents a value profile 41' which represents the payload data 34. The target entropy value 43 represents a permissible value profile 43'.

A result 44 of this comparison function can indicate that the sum 41 lies outside the tolerance interval resulting from the tolerance value 42 and the detection signal 25 must therefore be generated. Otherwise, the data packet can be recognized as a permissible data packet 14 and no detection signal 25 is generated, or the detection signal 25 can be used to signal that a valid or permissible data packet, i.e., authorized data traffic, has been recognized. Then, the next data packet received from the data network 11 can be analyzed.

The control unit 22 can have a processor circuit P for carrying out the test routines 23, 24.

The data elements 30 represent link information 30' which describes the communication link 16 along which the respective data packet is to be transmitted.

Overall, the examples show how the present disclosure can be used to provide a specification-based intrusion detection approach for use in the automotive Ethernet.

The invention claimed is:

1. A method for detecting unauthorized data traffic in a data network of a motor vehicle, the method comprising:
    reading out, by a processor circuit, at least one data packet transmitted in the data network;
    determining, by the processor circuit implementing a first test routine, whether header data of the at least one data packet includes link information indicating that the at least one data packet belongs to a communication link that is permitted for operation of the motor vehicle, the determining comprising:
        selecting at least one predetermined data element from the header data;
        calculating a hash value for the at least one predetermined data element; and
        determining, whether the hash value matches at least one target hash value stored in a data storage device for the communication link permitted for operation of the motor vehicle;
    in response to determining that the hash value matches the at least one target hash value and the at least one data packet belongs to the communication link permitted for operation of the motor vehicle, determining, by the processor circuit implementing a second test routine, whether payload data of the at least one data packet includes data values forming a value profile that is permissible for the communication link permitted for operation of the motor vehicle; and in response to determining that the hash value does not match the at least one target hash value and the at least one data packet does not belong to the communication link permitted for operation of the motor vehicle or the value profile of the data values in the payload data for the data packet is not permissible for the communication link permitted for operation of the motor vehicle, generating a detection signal signifying that the data packet is unauthorized data traffic,
wherein:
    the communication link permitted for operation of the motor vehicle is obtained from a vehicle specification of the motor vehicle,
    the processor circuit uses at least one selected from a cuckoo filter or a Bloom filter to determine whether the hash value matches the at least one target hash value, and
    the value profile for the data packet comprises the data values on an x-axis and a respective frequency value on a y-axis, each of the data values being a numerical value extracted from a data segment of the payload data, the respective frequency value being at least one of an absolute or relative frequency that each numerical value occurs in the data segment.

2. The method according to claim 1, wherein:
    the value profile further comprises an entropy value and a specific target entropy value, the entropy value being calculated based on the respective frequency value of each numerical value, the specific target entropy value being stored in a data storage device for the communication link permitted for operation of the motor vehicle, and
    the value profile is recognized as permissible for the communication link permitted for operation of the motor vehicle only if the entropy value deviates by less than a predetermined tolerance value from the specific target entropy value of the communication link to which the data packet belongs.

3. The method according to claim 2, wherein the entropy value is calculated by at least one of summing a logarithm of the respective frequency value of each numerical value or summing an inversion of the logarithm of the respective frequency value of each numerical value.

4. The method according to claim 1, wherein the at least one predetermined data element is selected from the header data that describes at least one property of the communication link selected from a group of properties comprising a sender address, a recipient address, a MAC address, and a payload length.

5. The method according to claim 1, wherein the data network is an Ethernet network.

6. A motor vehicle having a processor circuit configured to detect unauthorized data traffic in a data network, comprising:
    a memory for storing instructions; and
    one or more processors, communicatively coupled to the memory, configured to execute the instructions, the instructions causing the one or more processors to:
        read out, by the processor circuit, at least one data packet transmitted in the data network;
        determine, by the processor circuit implementing a first test routine, whether header data of the at least one data packet includes link information indicating that the at least one data packet belongs to a communication link that is permitted for operation of the motor vehicle, wherein to determine, the processor circuit is configured to:
select at least one predetermined data element from the header data;
calculate a hash value for the at least one predetermined data element; and
determine, whether the hash value matches at least one target hash value stored in a data storage device for the communication link permitted for operation of the motor vehicle;
in response to determining that the hash value matches the at least one target hash value and the at least one data packet belongs to the communication link permitted for operation of the motor vehicle, determine, by the processor circuit implementing a second test routine, whether payload data of the at least one data packet includes data values forming a value profile that is provided for the communication link permitted for operation of the motor vehicle; and in response to determining that the hash value does not match the at least one target hash value and the at least one data packet does not belong to the communication link permitted for operation of the motor vehicle or the value profile of the data values in the payload data for the data packet is not provided for the communication link permitted for operation of the motor vehicle, generate a detection signal signifying that the data packet is unauthorized data traffic, wherein:
the communication link permitted for operation of the motor vehicle is obtained from a vehicle specification of the motor vehicle,
the processor circuit uses at least one selected from a cuckoo filter or a Bloom filter to determine whether the hash value matches the at least one target hash value, and
the value profile for the data packet comprises the data values on an x-axis and a respective frequency value on a y-axis, each of the data values being a numerical value extracted from a data segment of the payload data, the respective frequency value being at least one of an absolute or relative frequency that each data value occurs in the data segment.

7. The motor vehicle according to claim 6, wherein the data network is electrically coupled to at least one control unit.

* * * * *

UNITED STATES PATENT AND TRADEMARK OFFICE
CERTIFICATE OF CORRECTION

| | |
|---|---|
| PATENT NO. | : 12,063,506 B2 |
| APPLICATION NO. | : 17/774121 |
| DATED | : August 13, 2024 |
| INVENTOR(S) | : Corbett et al. |

Page 1 of 1

It is certified that error appears in the above-identified patent and that said Letters Patent is hereby corrected as shown below:

On the Title Page

In item (54) and in the Specification Column 1, Lines 1-4, please delete the title and insert
-- METHOD AND CONTROL UNIT FOR DETECTING UNAUTHORISED DATA TRAFFIC IN A PACKET-ORIENTED DATA NETWORK OF A MOTOR VEHICLE, AND CORRESPONDING MOTOR VEHICLE --

Signed and Sealed this
Seventeenth Day of December, 2024

Derrick Brent
*Acting Director of the United States Patent and Trademark Office*